US011490586B2

(12) United States Patent
Savino et al.

(10) Patent No.: US 11,490,586 B2
(45) Date of Patent: Nov. 8, 2022

(54) METHOD AND PLANT FOR PRODUCTION OF A DAIRY-BASED PRODUCT IN PIECES

(71) Applicant: PRIMULA SOCIETA' SEMPLICE, Milan (IT)

(72) Inventors: Angelo Savino, Mezzanego (IT); Matteo Lavezzini, Fontanellato (IT)

(73) Assignee: PRIMULA SOCIETA' SEMPLICE, Milan (IT)

( * ) Notice: Subject to any disclaimer, the term of this patent is extended or adjusted under 35 U.S.C. 154(b) by 355 days.

(21) Appl. No.: 16/319,111

(22) PCT Filed: Jul. 19, 2017

(86) PCT No.: PCT/IB2017/054349
§ 371 (c)(1),
(2) Date: Jan. 18, 2019

(87) PCT Pub. No.: WO2018/015892
PCT Pub. Date: Jan. 25, 2018

(65) Prior Publication Data
US 2020/0146253 A1 May 14, 2020

(30) Foreign Application Priority Data
Jul. 22, 2016 (IT) .......................... 102016000077298

(51) Int. Cl.
*A01J 25/00* (2006.01)
*A01J 27/04* (2006.01)
(Continued)

(52) U.S. Cl.
CPC ............ *A01J 25/008* (2013.01); *A01J 25/12* (2013.01); *A01J 27/04* (2013.01); *A23C 19/0684* (2013.01); *A23C 2250/10* (2013.01)

(58) Field of Classification Search
CPC ...... A01J 25/002; A01J 25/0008; A01J 25/12; A01J 27/04; A01J 25/165; A23C 19/0684;
(Continued)

(56) References Cited
U.S. PATENT DOCUMENTS 2,643,495 A * 6/1953 Doering .................. A01J 21/02
53/122
3,887,719 A * 6/1975 Miller .................. A23C 19/084
426/517
(Continued)

FOREIGN PATENT DOCUMENTS

CN 1052988 A 7/1991
CN 1294494 A 5/2001
(Continued)

OTHER PUBLICATIONS

Yu, C. et al., "A Systems Analysis of Pasta Filata Process During Mozzerella Cheese Making", Journal of Food Engineering, Barking, Essex, Great Britain, vol. 69, No. 4, Aug. 1, 2005, pp. 399-408.
(Continued)

*Primary Examiner* — Drew E Becker
*Assistant Examiner* — Austin Parker Taylor
(74) *Attorney, Agent, or Firm* — Pearne & Gordon LLP

(57) ABSTRACT

A method for producing a dairy-based product in pieces, the product being mozzarella cheese or a preparation based on dairy products.
The method comprises the steps of:
 realising a first portion of a sheet (10) of the product;
 cooling the first portion of the sheet (10);
 obtaining pieces of the product from the first portion of the sheet (10).

10 Claims, 1 Drawing Sheet

(51) Int. Cl.
*A23C 19/068* (2006.01)
*A01J 25/12* (2006.01)

(58) Field of Classification Search
CPC . A23C 2250/10; A23C 19/08; A23C 19/0976; A23V 2002/00; A22C 2250/00; B65D 85/76; B65B 25/068; B65B 1/30–34; B65G 2203/0258; B65G 2814/0344
USPC .......................... 426/36, 524, 582; 62/62, 66
See application file for complete search history.

(56) References Cited

U.S. PATENT DOCUMENTS

| | | | |
|---|---|---|---|
| 5,004,616 A * | 4/1991 | Shanbhag | A23P 20/12 426/102 |
| 5,079,014 A | 1/1992 | Morikawa et al. | |
| 5,118,274 A | 6/1992 | Morikawa et al. | |
| 5,449,281 A * | 9/1995 | Dupart | A23G 3/2061 425/131.1 |
| 5,480,666 A | 1/1996 | Lindgren | |
| 6,589,580 B1 * | 7/2003 | Thakar | A23B 7/158 426/310 |
| 11,122,815 B2 | 9/2021 | Jani et al. | |
| 2003/0207012 A1 * | 11/2003 | Milani | A01J 27/04 426/515 |
| 2005/0118311 A1 * | 6/2005 | Best | A23G 1/305 426/302 |
| 2006/0029714 A1 | 2/2006 | Fischer et al. | |
| 2007/0243301 A1 * | 10/2007 | Barnett | A23P 30/34 426/559 |
| 2009/0226580 A1 * | 9/2009 | Singleton | A23C 19/0684 426/271 |
| 2012/0207888 A1 * | 8/2012 | King | A23G 4/025 426/237 |
| 2014/0287091 A1 * | 9/2014 | Jani | A23G 7/0093 426/5 |
| 2015/0040521 A1 * | 2/2015 | Hubner | B65B 9/04 53/513 |
| 2015/0044339 A1 * | 2/2015 | Heinzen | A23G 3/0093 426/304 |
| 2015/0064307 A1 * | 3/2015 | Wagter | A23C 19/0688 426/36 |
| 2015/0150268 A1 * | 6/2015 | Barnett | A21D 8/02 426/560 |
| 2015/0250197 A1 * | 9/2015 | Konchakovskiy | A23C 19/09 426/89 |
| 2021/0360942 A1 | 11/2021 | Jani et al. | |

FOREIGN PATENT DOCUMENTS

| | | | | |
|---|---|---|---|---|
| CN | 103857292 A | | 6/2014 | |
| DE | 102009045145 A1 * | | 4/2011 | .......... F25D 13/067 |
| FR | 2572255 A1 | | 5/1986 | |
| HU | 0400763 A2 | | 4/2006 | |
| JP | H02215365 A * | | 8/1990 | |
| SU | 126506 A1 * | | 11/1959 | |
| WO | 9962352 A1 | | 12/1999 | |
| WO | 2005099470 A1 | | 10/2005 | |
| WO | WO-2015147822 A1 * | | 10/2015 | ............. A23G 3/366 |

OTHER PUBLICATIONS

Guo, M.R., et al., "Effect of Sodium Chloride on the Serum Phase of Mozzarella Cheese", Journal of Dairy Science, American Dairy Science Association, United States, vol. 80, No. 12, Dec. 1, 1997, pp. 3092-3098.

Costabel L., et al., "Proteolysis in Mozzarella Cheeses Manufactured by Different Industrial Processes", Journal of Dairy Science, American Dairy Science Association, United States, vol. 90, No. 5, May 1, 2007, pp. 2103-2112.

McMahon, D.J., et al., "Water Partitioning in Mozzarella Cheese and Its Relationship to Cheese Meltability", Journal of Dairy Science, American Dairy Science Association, United States, vol. 82, No. 7, Jul. 1, 1999, pp. 1361-1369.

Perry D.B., et al., "Manufacture of Low Fat Mozzarella Cheese Using Expolysaccharide-Producing Starter Cultures", Journal of Dairy Science, American Dairy Science Association, United States, vol. 81, No. 2, Feb. 1, 1998, pp. 563-566.

* cited by examiner

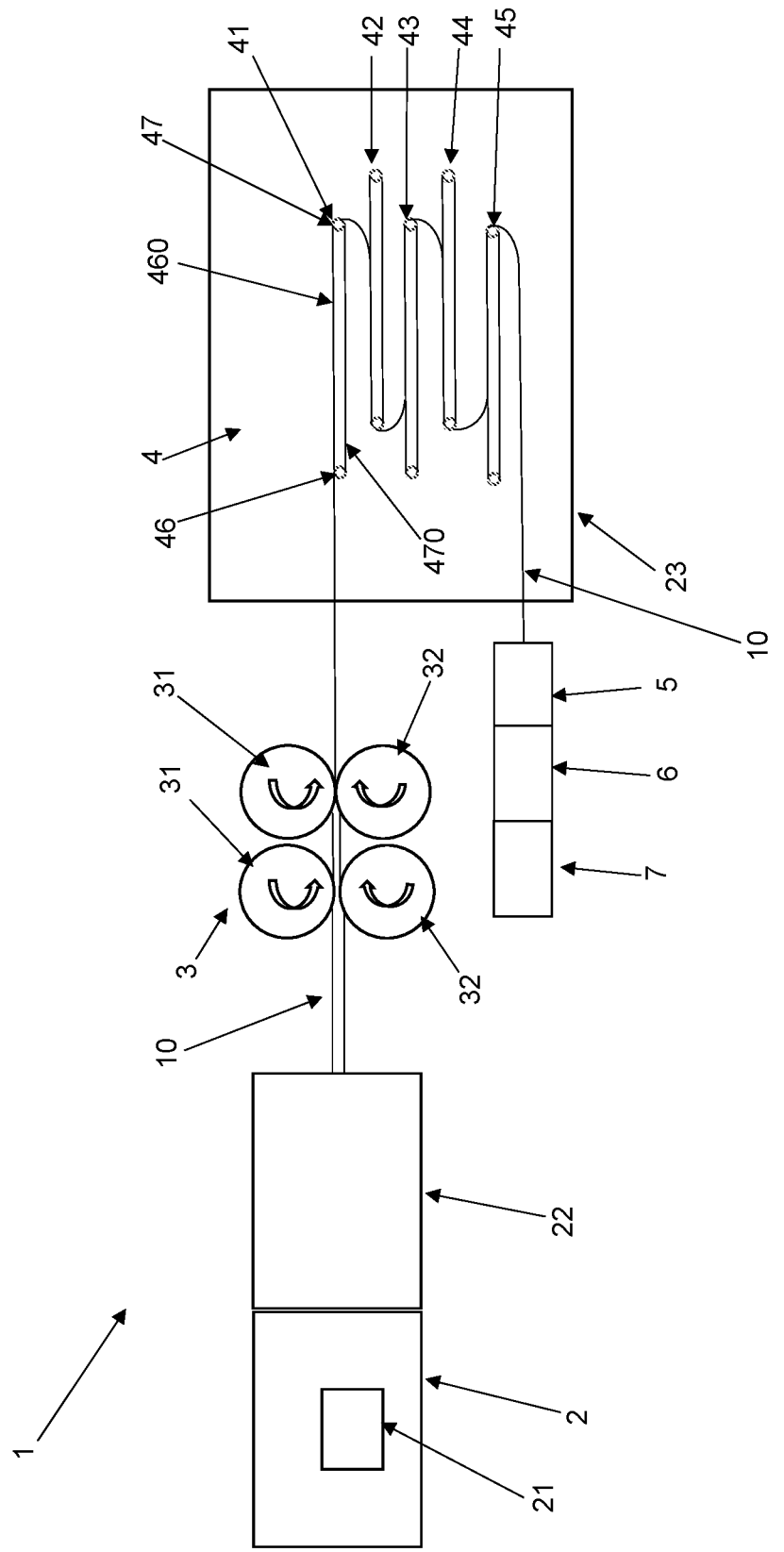

METHOD AND PLANT FOR PRODUCTION OF A DAIRY-BASED PRODUCT IN PIECES

TECHNICAL FIELD

The present invention relates to a method and a plant for producing a dairy-based product in pieces, typically for use on pizza. The dairy-based product can be a mozzarella or a dairy-based preparation (for example aromatised with specific components).

PRIOR ART

Today, the mozzarella used in pizzerias is obtained by realising a substantially cylindrical strip of mozzarella. The strip is then cooled by being placed in direct contact with water and then can be directly packaged and marketed, or cut so as to sell packs of pieces of already-cut mozzarella. In the latter case, the pizza baker is facilitated as he or she does not have to cut up the strip (this is the operation that has been carried out before packaging).

The strip has variable dimensions according to specific needs. Very common formats are, for example, cylinders having a length of about 280 millimetres and a diameter of about 75 or 110 millimetres.

A drawback of the above-described operating mode is linked to the significant consumption of cooling water which translates into relevant working costs (a plant working at a normal operating speed can consume tonnes of water in a year). These costs are further connected to the fact that as the water comes into contact with the mozzarella, before elimination the water has to be treated so as to respect certain standards. In a case where, in order to obviate these drawbacks, it was decided to cool the cylindrical strips in air, there would be much longer cooling times (which penalise production).

Further, the cooling of the strip in water means that a product is obtained an external part of which is much moister than the internal core thereof.

US2006/029714 discloses a process for producing mozzarella cheese.

AIM OF THE INVENTION

In this context, the technical task underpinning the present invention is to propose a method and a plant for producing mozzarella in pieces which obviates the drawbacks of the aforementioned prior art.

In particular, an aim of the present invention is to provide a plant and a method that enables reducing times and costs of production while at the same time increasing the shelf life and production with an increase in product moisture level.

The stated technical task and specified objects are substantially achieved by a plant and a method, comprising the technical features disclosed in one or more of the appended claims.

BRIEF DESCRIPTION OF THE DRAWINGS

Further characteristics and advantages of the present invention will become more apparent from the following indicative, and hence non-limiting, description of a preferred, but not exclusive, embodiment of a plant and a method, as illustrated in FIG. 1, which schematically illustrates by way of example a solution of the present invention.

DETAILED DESCRIPTION OF PREFERRED EMBODIMENTS OF THE INVENTION

In the appended FIGURES, reference number 1 denotes a production plant of a dairy-based product in pieces. The product is mozzarella or a dairy-based preparation (for example aromatised with specific components). The product is preferably mozzarella for pizza and/or for baked products. The production plant 1 for the product in pieces can preferably be seen as a plant for transforming the product (and therefore the raw material constituting the product). The plant 1 comprises a stretcher 2 comprising heating means 21 of a mixture (the curd). In this way a spun paste (pasta filata) is obtained. The plant 1 comprises forming means 22 of a sheet of said product located downstream of the stretcher 2. The forming means 22 are extrusion means. The forming means 22 enable shaping the spun paste as a sheet. The sheet is a layer that extends substantially parallel to a surface. It has a substantially two-dimensional extension, in any case having a reduced thickness.

Downstream of the forming means 22 the plant 1 can advantageously comprise a calibrating station 3 comprising thinning means of the thickness of the sheet. Typically the calibrating station 3 comprises one or more stations comprising counter-rotating rollers that reduce the thickness of the sheet transiting therebetween.

The plant 1 further comprises cooling means 23 of the sheet. The cooling means 23 extend downstream of the forming means 22 and also advantageously downstream of the calibrating station 3. In particular they comprise a cooling tunnel 4. In conformity with what is described in the foregoing, the tunnel 4 is located downstream of the forming means 22. In the cooling tunnel 4, the air is cooled and in turn cools the sheet by natural or forced convection. The fact that the product is present in the form of a sheet is such that it is rapidly cooled, as it has a reduced thickness and a large heat-exchange surface. In this way, notwithstanding the use of air (and not a liquid) as a coolant, cooling can be accelerated.

The plant 1 further comprises a forming or cutting station 5 of pieces of said product. The forming or cutting station 5 realises the pieces starting from the sheet. Typically the cutting station 5 comprises cutting means (typically mechanical) of the sheet. The forming station 5 is located downstream of the cooling tunnel 4. The forming station 5 can comprise moulding means, which punch the sheet to form pieces of said product having a predefined shape (identical to the shape envisaged according to the moulding means used). Alternatively the cutting station 5 can comprise cutting blades, possibly rotating.

Downstream of the forming or cutting station 5, the plant 1 advantageously comprises a weighing station 6 of the pieces of said product.

The plant 1 further comprises a packing station 7 of pieces of said product. The present invention further relates to a method for production of a product in pieces based on dairy products, preferably to be used with pizzas and/or baked products. The product is mozzarella or a dairy-based preparation (for example aromatised with specific substances). The method is advantageously implemented by a plant 1 having one or more of the characteristics described in the foregoing. The method includes a step of realising a sheet 10 of product and the product comprises a first portion. The first portion is typically part of a sheet of a larger extension. The step of realising a sheet includes heating a curd to obtain a spun paste (this step is also known as spinning). Further, the above step includes realising a first portion of the sheet 10 by extrusion. The sheet 10 has a first thickness. It is typically greater than 13 millimetres. The first portion is then advanced along a working line along which further steps included in the method are carried out, with the aim of obtaining the desired pieces of product.

The method advantageously comprises the step of crushing to reduce the first thickness. The step of reducing by crushing the first thickness includes causing the first portion of the sheet 10 to transit into one or more calibrating stations 3, which advantageously comprise two counter-rotating crushing rollers 31, 32. In this way a first portion of the sheet 10 can be obtained that has a thickness of less than 6 millimetres and possibly even less than 4 millimetres.

The first portion obtained in this way is at a temperature of higher than ambient temperature. It is typically at a temperature of greater than 45° C.

The heat derives from the heating for obtaining a spun paste.

The method then comprises a step of cooling the sheet 10.

The step of cooling the first portion of the sheet 10 comprises a step of advancing the first portion of the sheet 10 in a cooling tunnel 4.

The step of advancing the first portion of the sheet 10 in a cooling tunnel 4 comprises a sub-step of positioning the first portion of the sheet 10 on a perforated advancing belt 43, which transits internally of the tunnel 4. The perforated belt 43 also comprises a plurality of holes, which pass through the thickness of the belt 43. In this way the cooling of the first portion of the sheet is made more rapid during transit through the cooling means 23. The first portion of the sheet 10 in the cooling tunnel 4 is appropriately advanced on a belt 42, which has a support surface without holes.

In particular, the first portion of the sheet is advanced first on the advancing belt 42 having a support surface of the sheet 10 that is without holes and then on the perforated advancing belt 43. In fact, initially the sheet 10 while still hot is more easily deformable and the holes might leave marks thereon. Thereafter the cooled sheet is more rigid and therefore the holes enable accelerating the cooling without leaving any impression on the sheet.

In the solution illustrated by way of example in the FIGURES, the above takes the form that the step of cooling the first portion of the sheet 10 includes causing said first portion of the sheet 10 to transit on at least one group 41, 42, 43, 44, 45 of advancing belts located one above another which transit in the tunnel 4. There are preferably five belts in said group. Each of said belts defines, between two corresponding end rollers 46, 47, an upper trajectory 460 and a lower trajectory 470. The first portion of the sheet advances, transported by the belt along the upper trajectory 460 while at the start of the lower trajectory 470 it will detach from the belt by force of gravity.

In the following a description is made of the passage of the first portion of the sheet from an overlying belt to an underlying belt, which is a part of said group 41, 42, 43, 44, 45 of belts. At the end of the upper trajectory 460 the overlying belt winds about one of said two end rollers 46, 47, laying the first portion of the sheet 10 of mozzarella by force of gravity onto the underlying belt which advantageously circulates in an opposite direction with respect to the overlying belt (if one is clockwise, the other is anti-clockwise). The step of laying the first portion of the sheet 10 by force of gravity onto the underlying belt 45 comprises the step of overturning the first portion of the sheet 10. Following the step of overturning a face of the first portion of the sheet 10 will now be facing upwards which was facing downwards on the overlying belt 44.

In practice, the Applicant has observed that the step of cooling the first portion of the sheet 10 includes cooling the first portion in contact with the air present in the tunnel for less than 3 minutes in order to bring it from a temperature of greater than 45° C. down to a temperature of lower than 25° C.

The method further comprises a step of obtaining pieces of product from the first portion of the sheet 10. In particular the step of obtaining pieces of product comprises a step of cutting the first portion of the sheet 10.

Purely by way of example the step of cutting the first portion of the sheet 10 is done by placing the sheet in contact with at least one rotating element (advantageously two rotating groups). In an alternative solution a punching of the first portion of the sheet 10 with a die might be included so as to obtain cut pieces that are complementarily-profiled to the perimeter of the die.

The pieces of product can be cut according to the desired shapes, for example in cubes, or julienne, according to a profile (including a complex profile) and defined by the die that punches the sheet, etc.

The method further comprises the step of packaging the pieces of product. The pieces, after being batched (for example in a weighing station) can be inserted in packs, which will then be appropriately sealed. In this way the final user can use the already-shaped pieces of product without any need to cut them beforehand. The packaging includes inserting a plurality of pieces together in a same wrapping. Internally of the wrapping the pieces of product are preferably in direct contact with one another.

The invention as it is conceived enables achieving multiple advantages. Firstly, it enables accelerating production. In fact the cooling of a sheet of mozzarella or another dairy-based preparation is achieved much more rapidly with respect to a compact cylinder, in which the core remains hot for a long time. The speed of cooling is such that air can be used as the operating fluid, without having to immerse the product in water. There is consequently a saving in consumption of water, which is translated into:

a saving in the annual cost for water;
an appreciable optimisation of environmental resources;
an economic saving deriving from the fact that as cooling water is no longer used, the costs for treatment of that water (as it has been in contact with the product, before being discharged water has to be specifically treated) are eliminated.

A further important advantage directly connected to the air-cooling is obtaining a product having a much more homogenous moisture with respect to a situation in which cooling in water is performed. Further, by cooling in air the moisture context of the product is higher that when it is cooled in water and this enables increasing the performance.

The invention as it is conceived is susceptible to numerous modifications and variants, all falling within the scope of the inventive concept characterising it. Further, all the details can be replaced with other technically-equivalent elements. In practice, all the materials used, as well as the dimensions, can be any according to requirements.

The invention claimed is:

1. A method for producing mozzarella in pieces, comprising steps of:
heating a mixture by heating means (21) of a stretcher (2);
forming a sheet (10) of said mozzarella by extrusion, said sheet comprising a first portion; the step of forming a sheet being realised by forming means (22) located downstream of the stretcher;

thinning the thickness of the sheet in a calibrating station downstream of the forming means (22);

cooling said first portion of the sheet (10); the step of cooling said first portion of the sheet (10) comprising a step of advancing said sheet (10) into a cooling tunnel (4), wherein air is an operating cooling fluid of the mozzarella, without having to immerse the mozzarella in water; the step of cooling the first portion of the sheet (10) comprising the step of cooling the first portion in contact with the air present in the tunnel for less than 3 minutes in order to bring it from a temperature of greater than 45° C. down to a temperature of lower than 25° C.; the step of cooling the first portion of the sheet (10) includes causing said first portion of the sheet (10) to transit on at least a group (41, 42, 43, 44, 45) of advancing belts which transit in the tunnel (4), the belts of said group (41, 42, 43, 44, 45) are located one above another; each of said belts defining, between two corresponding end rollers (46, 47), an upper trajectory (460) and a lower trajectory (470), the group (41, 42, 43, 44, 45) of belts comprising an overlying belt and an underlying belt; at the end of the upper trajectory (460) the overlying belt winds about one of said two end rollers (46, 47), laying the first portion of the sheet (10) by force of gravity onto the underlying belt which circulates in an opposite direction with respect to the overlying belt; the step of laying the first portion of the sheet (10) by force of gravity onto the underlying belt comprising a step of overturning the sheet (10) by turning a face of the first portion of the sheet (10) upwards which was facing downwards on the overlying belt; wherein the underlying belt is the lowermost belt of the group of belts; wherein, when the step of overturning occurs from the overlying belt to the underlying belt, the first portion of the sheet (10) is of a sufficient temperature to permit said overturning;

obtaining shaped pieces of said mozzarella from said first portion of the sheet (10);

batching the shaped pieces;

packaging the shaped pieces of said mozzarella; the step of packaging comprising the step of inserting a plurality of shaped pieces together in a same wrapping, internally of the wrapping the shaped pieces of the mozzarella being in direct contact with one another.

2. The method according to claim 1, characterised in that the step of forming a first portion of the sheet (10) of said mozzarella comprises steps of:

forming said first portion of the sheet (10) having a first thickness by extrusion;

reducing said first thickness by crushing.

3. The method according to claim 2, characterised in that the first thickness is greater than 13 millimetres; the step of reducing by crushing the first thickness includes causing said first portion of the sheet (10) to transit into one or more calibrating stations (3) comprising two counter-rotating crushing rollers (31, 32), obtaining for said first portion a sheet (10) having a thickness of less than 6 millimetres.

4. The method according to claim 3, wherein the step of reducing the first thickness by crushing provides said first portion of the sheet (10) having a thickness of less than 4 mm.

5. The method according to claim 1, wherein one of said advancing belts is a perforated advancing belt (43).

6. The method according to claim 5, wherein one of said advancing belts is an advancing belt (42) having a support surface of the sheet (10) lacking holes; the first portion of the sheet (10) transiting on said advancing belt (42) having a support surface of the sheet (10) lacking holes before transiting on said perforated advancing belt (43).

7. The method according to claim 1, characterised in that the step of obtaining pieces of said mozzarella from the first portion takes place (a) by placing the first portion of the sheet (10) in contact with blades of two rotating groups or (b) by punching, with a die, the first portion of the sheet (10) so as to obtain pieces that are complementarily-shaped with respect to the perimeter of the die.

8. The method according to claim 1, wherein the only step which, by design, changes the temperature of the mozzarella between the thinning step and the obtaining step is the cooling step.

9. The method according to claim 1, wherein the group of advancing belts includes at least five advancing belts.

10. The method according to claim 1, wherein the total number of advancing belts located in the tunnel (4) is five.

* * * * *